3,147,267
2,6-DICYANOPIPERIDINE AND ITS PRODUCTION VIA GLUTARALDEHYDE DICYANHYDRIN AS AN INTERMEDIATE

Arthur O. Rogers, Lewiston, N.Y., assignor to E. I. du Pont de Nemours and Company, Wilmington, Del., a corporation of Delaware
No Drawing. Filed Oct. 1, 1958, Ser. No. 764,514
1 Claim. (Cl. 260—293)

This invention relates to 2,6-dicyanopiperidine and its preparation. 2,6-dicyanopiperidine can be converted to the corresponding piperidine dicarboxylic acid. Dicarboxylic acids of this general type are known to be useful in the production of polyamide and polyester resins.

It is an obect of the invention to provide a method for preparing 2,6-dicyanopiperidine, which is a new compound. A further object is to provide a method for preparing that compound which involves the intermediate preparation of glutaraldehyde dicyanhydrin, also a new compound. Other objects will be apparent from the following description and claim.

In accordance with the invention, glutaraldehyde is reacted with hydrogen cyanide to yield glutaraldehyde dicyanhydrin ($\alpha,\alpha'$-dihydroxypimelonitrile) and the latter is converted to 2,6-dicyanopiperidine by reaction with ammonia.

The reactions are as follows:

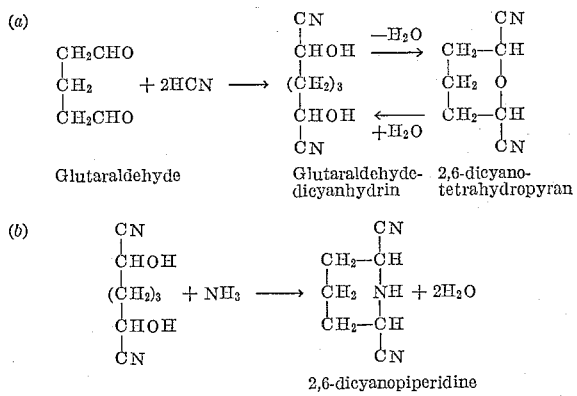

As indicated, the glutaraldehyde dicyanhydrin of reaction (a) may exist in equilibrium with its cyclic equivalent, 2,6-dicyanotetrahydropyran.

Reaction (a) can be carried out simply by bringing the reactants together in the presence of a base which catalyzes the reaction. Any substance which is sufficiently basic in the presence of water, i.e., will give a pH substantially above pH 7, e.g., pH 8 or higher, can be used as catalyst. Examples are ammonia and those amines and quarternary ammonium hydroxides which have dissociation constants at 25° C. of at least $1 \times 10^{-5}$, such as the methyl, diethyl, triamyl, diethylbenzyl and cyclohexyl amines; ethylene diamine, piperidine, trimethylbenzyl ammonium hydroxide and tetramethyl ammonium hydroxide. Also suitable for use as catalysts are the alkali and alkaline earth metal hydroxides such as sodium and potassium hydroxide, and various basic reacting alkali metal salts such as sodium carbonate, potassium cyanide, sodium sulfide, sodium silicate and trisodium phosphate. Basic reacting ion-exchange materials, i.e., anion-exchange resins in basic form, are also effective catalysts even though they do not make an aqueous reaction medium itself basic because they are insoluble. Suitable anion-exchange resins are those having functional quaternary ammonium groups whose basic nitrogen atoms are attached through a saturated aliphatic hydrocarbon group, e.g., of 1 to 4 carbon atoms, to the aromatic nuclei of a cross-linked polymer of a vinyl aromatic hydrocarbon, preferably a copolymer of a monovinyl aromatic hydrocarbon such as styrene and a polyvinyl aromatic hydrocarbon such as divinyl benzene. Also suitable are the amine type anion-exchange resins made by polymerization or condensation of amines, e.g., by reacting together a phenol, an aliphatic amine and formaldehyde or by condensation of a ketone, a phenol and a polyamine.

The glutaraldehyde employed in reaction (a) may be obtained in any desired manner. A convenient known method for its preparation involves the hydrolysis of a 2-alkoxy-3,4-dihydro-2H-pyran, e.g., 2-ethoxy-3,4-dihydro-2H-pyran (hereinafter called ethoxydihydropyran), in an aqueous medium in the presence of an acid catalyst. The glutaraldehyde product may be in equilibrium with its cyclic equivalent, 2,6-dihydroxytetrahydropyran, as indicated by the reaction:

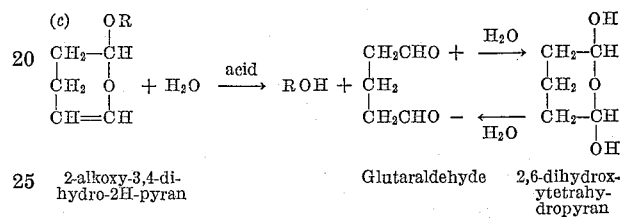

2-alkoxy-3,4-di-hydro-2H-pyran    Glutaraldehyde    2,6-dihydroxytetrahydropyran In the above, R is an alkyl radical, preferably having 1 to 4 carbon atoms.

When obtained by the above method, the resulting aqueous solution of glutaraldehyde is preferably employed directly in carrying out reaction (a), since isolation of the glutaraldehye prior to use generally entails losses. Reaction (a) is conveniently carried out by adding a sufficient amount of a base to the above aqueous solution of glutaraldehyde to adjust its pH to at least 8, preferably 8.5 to 12, and the hydrogen cyanide reactant is then added. Alternatively, a non-alkaline and unreacted mixture of the two reactants may be added to an alkaline reaction mixture, or the two reactants may be added separately to an alkaline reaction mixture. The reaction is conveniently carried out at about room temperature, and temperatures of from 0 to 40° C. give good results. At higher temperatures, the conversion to the dicyanhydrin is somewhat lower while at lower temperatures the reaction is slower. However, temperatures ranging from the freezing point (about —20° C.) of the reaction mixture to the boiling point of the reaction mixture are generally effective.

The glutaraldehyde dicyanhydrin can be recovered, e.g., as a thick syrup, by evaporating the reaction mixture. If isolation is desired, it is preferred that the basic catalyst be neutralized, e.g., with a slight excess of an acid, before evaporating off the solvent, since the dicyanhydrin tends to decompose, particularly at elevated temperature, in the presence of basic materials.

When employing the glutaraldehyde dicyanhydrin as a reactant for reaction (b), it is not necessary that it be isolated from its reaction mixture prior to use. Preferably, the reaction mixture from reaction (a) is employed directly in carrying out reaction (b) by adding ammonia thereto. Anhydrous or aqueous ammonia can be used as can also solutions of ammonia in an inert solvent such as methanol, ethanol, isopropyl alcohol, ether, dioxane, tetrahydrofuran, glycol, pyridine, and triethylamine. Reaction (b) will generally be carried out at a temperature in the range of 0 to 100° C., but higher and lower temperatures, e.g., ranging from —20 to 150° C., or higher, can be used.

Reaction (a) will generally be carried out employing at least 2 moles of hydrogen cyanide per mole of glutaraldehyde, but an excess of either reactant can be used.

Mole proportions of 2.5 to 10 moles of hydrogen cyanide per mole of glutaraldehyde are preferred. Reaction (*b*) can be carried out employing the reactants in equimolar proportions, or even with the dicyanhydrin in excess. However, since ammonia is the cheaper of the reactants, its use in substantial excess will generally be desirable to obtain maximum conversion of the more expensive glutaraldehyde dicyanhydrin to the dicyanopiperidine. The use of from 4 to 20 moles of ammonia per mole of dicyanhydrin is preferred. Still higher proportions of ammonia can be used but provide no added advantage.

2,6-dicyanopiperidine is a crystalline solid melting at about 115° C. when pure. It is sparingly soluble in cold water but dissolves readily in hot water to give neutral solutions. Hydrolysis with a strong mineral acid yields 2,6-dicarboxypiperidine (hereinafter called piperidinedicarboxylic acid), identified by neutralization equivalent and by the chloride ion content of its hydrochloride.

The intermediate glutaraldehyde dicyanhydrin has been isolated only as a thick viscous syrup. It has been identified through its preparation according to reaction (*a*) and by its conversion to the above dicyanopiperidine with identification of the latter by hydrolysis to piperidinedicarboxylic acid.

The invention is illustrated by the following examples.

Example 1

A mixture of ethoxydihydropyran (12.8 g., 0.1 mole), water (130 g.) and concentrated hydrochloric acid (0.2 ml.) was stirred at essentially room temperature until a clear solution of glutaraldehyde was obtained (3 hours and 40 minutes). The solution was made basic (pH about 10) by the addition of a few pellets of sodium hydroxide and cooled in an ice bath. Liquid hydrogen cyanide (8 ml., 0.2 mole) was added with stirring. The temperature rose rapidly to about 20° C. then fell again, indicating a rapid exothermic reaction. After standing about 2 hours to insure completion of the reaction, ammonium hydroxide (13.5 ml., 0.2 mole) was added and the mixture allowed to stand 1 hr. at 23–27° C. without application of heat. Upon adding a second portion of ammonium hydroxide (0.2 mole) a crystalline precipitate formed.

After standing overnight, the reaction mixture was filtered, the crystals washed sparingly with water and dried in a vacuum oven. The dried product (3.1 g.) melted at 111–114° C. A sample which had been recrystallized from water was found, by analysis, to have the correct composition for dicyanopiperidine.

Example 2

Ethoxydihydropyran (0.1 mole) was hydrolyzed to glutaraldehyde and the latter reacted with hydrogen cyanide as described in Example 1. Ammonium hydroxide (130 ml., 2.0 moles) was added to the resulting solution and allowed to react overnight at room temperature. The mixture, which contained a crystalline precipitate, was cooled in an ice bath with stirring, then filtered to obtain a first crop (3.0 g.) of product (2,6-dicyanopiperidine). A second crop (2.4 g.) was recovered from the mother liquor after partial evaporation. Further amounts of the product remained in the final mother liquor.

The first crop of crystals was mixed with concentrated hydrochloric acid (25 ml.) and heated on the steam bath in a covered beaker. The crystals dissolved upon heating and shortly thereafter a heavy, white precipitate formed. After one hour, the mixture was allowed to evaporate to dryness on the steam bath. The white crystalline residue was dissolved in boiling water (70 ml.) and recrystallized by cooling. The resulting crystals, after filtering, washing and drying, were found by analysis to contain 16.8% chloride ion; the theoretical value for piperidinedicarboxylic acid hydrochloride is 17.4%.

Example 3

Ethoxydihydropyran (0.1 mole) was hydrolyzed to glutaraldehyde and the latter reacted with hydrogen cyanide essentially as described in Example 1. The resulting solution was acidified with a few drops of phosphoric acid and evaporated to constant weight on the steam bath under vacuum. The residue was a viscous, amber-colored syrup weighing 15.0 g.; the theoretical weight for 0.1 mole of glutaraldehyde dicyanhydrin is 15.4 g.

A portion (13.5 g.) of the above syrup was mixed with ammonium hydroxide (400 ml., 6 moles) and allowed to stand overnight at room temperature. After evaporation on the steam bath under vacuum until it was largely crystallized, the mixture was cooled in ice water and filtered. After washing once with water and drying in a vacuum, there was obtained a somewhat impure 2,6-dicyanopiperidine product (4.2 g.) melting at 100–106° C.

The mother liquor from the above crystallization was heated overnight on the steam bath with hydrochloric acid (42 ml., 0.5 mole). A crystalline precipitate formed. The mixture was cooled in ice water and the precipitate filtered off, washed with water and dried; weight 2.1 g. This was recrystallized from water and shown by analysis to be piperidinedicarboxylic acid hydrochloride (found, 17.0% chloride ion; calc. 17.4%).

The mother liquor from the above hydrolysis mixture was evaporated to constant weight on the steam bath under vacuum. The residue (13 g.) was extracted with boiling methanol, the extract filtered and treated with pyridine (10 ml.). A precipitate formed slowly. This was filtered off, washed with methanol and dried; weight, 1.7 g. Titration with sodium hydroxide using phenolphthalein as indicator showed the neutralization equivalent of this material to be 188. This agrees reasonably well with the neutralization equivalent of 173 calculated for piperidinedicarboxylic acid on the basis of one titratable acidic group.

Attempts were made to find by-products of the above reactions but none were found. Experience has indicated that both reactions (*a*) and (*b*) proceed with high conversions to the products indicated by the above equations.

The invention provides a practical method for obtaining 2,6-dicyanopiperidine involving the intermediate formation of glutaraldehyde dicyanhydrin. This dicyanopiperidine is useful as a chemical intermediate, particularly for preparing piperidinedicarboxylic acid which is useful in the production by known methods of polyamide and polyester resins of the general types which are used extensively commercially. It can also be converted to the corresponding diamine which can also be used in preparing polyamide resins by known methods.

I claim:
2,6-dicyanopiperidine.

References Cited in the file of this patent

UNITED STATES PATENTS

| | | |
|---|---|---|
| 2,421,650 | Reppe et al. | June 3, 1947 |
| 2,525,584 | Bordner et al. | Oct. 10, 1950 |
| 2,580,738 | De Benneville et al. | Jan. 1, 1952 |
| 2,731,489 | Stansbury et al. | Jan. 17, 1956 |
| 2,745,865 | Journeay | May 15, 1956 |

OTHER REFERENCES

Richter's Organic Chemistry (Heterocyclic Compounds), vol. IV; pp. 4 and 5; 1947, N.Y.